United States Patent [19]

Anderson

[11] Patent Number: 4,685,986
[45] Date of Patent: Aug. 11, 1987

[54] METHOD OF MAKING HONEYCOMB STRUCTURE WITH JOINED SINGLE PLEAT MATERIAL

[75] Inventor: Richard N. Anderson, Owensboro, Ky.

[73] Assignee: Hunter Douglas, Inc., Totowa, N.J.

[21] Appl. No.: 869,865

[22] Filed: Jun. 2, 1986

Related U.S. Application Data

[62] Division of Ser. No. 796,035, Nov. 7, 1985.

[51] Int. Cl.⁴ .............................................. B32B 3/12
[52] U.S. Cl. ................................ 156/197; 160/84 R; 428/116; 428/152; 428/188
[58] Field of Search ...................... 156/197; 160/84 R; 428/116, 152, 188

[56] References Cited

U.S. PATENT DOCUMENTS

| | | | |
|---|---|---|---|
| 1,677,714 | 7/1928 | Frease | 428/188 XR |
| 2,020,639 | 11/1935 | Grayson et al. | 428/188 XR |
| 2,201,356 | 5/1940 | Terrell | 428/116 X |
| 3,164,507 | 1/1965 | Masuda | 428/116 X |
| 3,168,432 | 2/1965 | Elfring | 428/116 |
| 3,669,820 | 6/1972 | Fredericks | 428/116 |
| 3,788,922 | 1/1974 | Rasmussen | 428/116 X |
| 3,892,898 | 7/1975 | Yasui | 428/116 |
| 4,001,474 | 1/1977 | Hereth | 428/116 |
| 4,288,485 | 9/1981 | Suominen | 428/116 |
| 4,307,768 | 12/1981 | Anderson | 428/116 X |
| 4,388,354 | 6/1983 | Suominen | 428/116 X |
| 4,390,575 | 6/1983 | Kopp | 428/36 |
| 4,450,027 | 5/1984 | Colson | 156/197 X |

Primary Examiner—Henry F. Epstein
Attorney, Agent, or Firm—Pennie & Edmonds

[57] ABSTRACT

A honeycomb structure formed of two continuous lengths of pleated materials secured together intermediate the pleats. Each length of pleated material defines one side of the honeycomb structure. The two continuous lengths are secured together by feeding them longitudinally of their length and toward each other. At the location where the two lengths meet, they are joined together intermediate their pleats.

12 Claims, 6 Drawing Figures

METHOD OF MAKING HONEYCOMB STRUCTURE WITH JOINED SINGLE PLEAT MATERIAL

This is a division of application Ser. No. 796,035, filed Nov. 7, 1985.

BACKGROUND OF THE INVENTION

The present invention relates to an expandable honeycomb structure such as used for window coverings. The structure is made of two separate pleated materials which are secured together so that when expanded, they define a plurality of longitudinally extending cells, one on top of the other. In the retracted state of the honeycomb structure, the adjacent cells are collapsed on each other.

The prior art discloses various honeycomb structures made generally from a single piece of foldable material. Representative of such prior art are Rasmussen U.S. Pat. Nos. Re. 30,254 and Re. 31,129, the patent to Masuda, U.S. Pat. No. 3,164,507, and the patent to Colson, U.S. Pat. No. 4,450,027. The prior art also includes honeycomb structures fabricated from separate sheets of material which are secured together to form individual cells. Representative of this prior art are the patents to Whitney, U.S. Pat. No. 1,827,718, Hartsell et al, U.S. Pat. No. 3,077,223, and the patents to Suominen, U.S. Pat. Nos. 4,288,485 and 4,388,354.

A difficulty with all of the prior art constructions is the ability to manufacture the honeycomb cells with opposite faces of different physical characteristics. This is sometimes desirable either for aesthetic of mechanical reasons. For example, thermal insulation against heat or cold, besides that given by the cell structure, can be provided by appropriate surfacing of the material of the structure which faces the elements. With the prior art constructions, as for example disclosed in the '027 patent, where a single piece of material is used to form the cells, different portions of the material which will ultimately define the opposite sides of the structure have to be separately processed prior to the formation of the honeycomb configuration. Problems of alignment of the differently treated surfaces can result in an inferior or unacceptable product. More particularly, the material must be fed accurately and folded accurately along its length. Also, it must be secured to the adjacent cell in such a way as to cover the line of demarcation separating the two differently treated surfaces. Otherwise, the different surfaces will show through from one side of the structure to the other.

With the honeycomb structures such as disclosed in the Suominen patents, different sheets of material are used to form the structure. These materials can obviously be made with different physical characteristics. However, this will not result in the opposite faces of the resulting honeycomb structure having different physical characteristics. This is so because of the method of manufacture. In Suominen, the materials are fed longitudinally and secured together longitudinally at spaced locations across the material. Therefore, in the expanded honeycomb structure, the opposite faces will be formed partially by one material and partially by the other material. Again, in order to have one entire side of the honeycomb structure provided with physical characteristics different from the other side, each material must be processed differently across its width in the same way as required with the single piece of material which is folded to form the cells of the honeycomb structure.

Another aspect of the honeycomb structures of the prior art relates to the creasing or pleating of the material forming each cell. One reason pleating is provided is to assist in the orderly collapsing of the individual cells as the structure is moved between an expanded and retracted position. Without pleats, the collapsing of the cells would tend to be haphazard and not give a neat appearance to the structure. In the cell construction disclosed in the '027 patent, the pleats are formed to be permanent so that the faces of the honeycomb structure extend in angular configuration in the expanded condition of the structure. If the pleats are not carefully and properly formed, they will tend to hang out. This is especially so after long, continued use of the structure, with the expanded condition being one where the cells lie one below the other. In such an orientation, the weight of the structure itself pulls on the material of the overlying cells with the greatest forces being exerted at the top of the structure by the entire weight of the underlying cells Any falling out of the pleats tends to increase the overall height of the structure over the height as initially manufactured. The effect of this can be unpleasing and unsatisfactory, both aesthetically and physically.

The honeycomb structures disclosed in the prior art cited above may be made of very thin material where, for example, a translucent effect is desired. With very thin material care must be taken in the choice of adhesive that is used and the manner in which it is applied. This is important, not only from the manufacturing aspects but also from the standpoint of durability of the resulting structure. With regard to manufacturing, too much adhesive or the wrong kind of adhesive and somewhat porous cell material can cause bleeding of the adhesive through the material. With the prior art structures where the secured materials are wound in layers upon each other, bleeding of adhesive through the material can cause successive layers to become adhered to each other so as to produce cells which are glued closed and will not normally open. This can either destroy the product or require extra procedures to separate the layers and open the cells. As far as durability is concerned, the adhesives chosen must, in many instances, be capable of withstanding the severe heat and sunlight when used in windows. The compatability of such adhesives which give proper durablity is not always the best as far as avoiding manufacturing bleedthrough problems.

SUMMARY OF THE PRESENT INVENTION

According to the teachings of the present invention, an expandable-collapsible honeycomb structure is provided from two pleated lengths of material, one of these materials will form one side of the honeycomb structure, while the other will form the other side. Thus, they can be made of the same or different material. Also, the pleats in the material can be formed as part of the honeycomb forming process or can be preformed. In any event, the pleated materials are secured together along the pleats. This connection can be effected while the pleated materials are in partially expanded condition, whereby any bleedthrough of adhesive will not contact adjacent sections of the materials and improperly cause these sections to become attached to each other. The materials used can be any foldable material such as disclosed in U.S. Pat. No. 4,450,027, those made of non-woven fibers of polyester or woven materials from plastic or textile fibers plus plastic. Also, laminates can be used. With these materials it will be the absorbtion in and through a somewhat porous layer that creates the bleeding through problem of the prior art.

In addition, with applicant's invention, the two pieces of material forming the opposite faces of the cells can be secured together by separate strip materials extending longitudinally between the cells. The advantage of this is that the strip materials can be chosen so as to permit a wider choice of adhesives. For example, the strip materials can be more impermeable or thicker than the materials from which the rest of the honeycomb structure is fabricated. Also, the use of strip materials to connect the opposite faces of the cells of the honeycomb structure facilitates spacing of the opposite faces from each other. This in turn, gives the resulting cell structures better insulating qualities and also provides internal area for concealment of the associated cords and operating mechanism to be used with the honeycomb structure.

The pleats in the two pieces of material from which the honeycomb structure is made can also be formed intermediate the points of attachment of the two pieces of material. These pleats are formed along fold lines extending longitudinally of the cells and these fold lines can be creased to produce permanent pleats which will retain their shape in the expanded condition of the cells. Alternatively, the pleats can be formed to be sufficient merely to guide the folding and unfolding of the material along the creases in an orderly manner as the honeycomb structure is collapsed and expanded.

Where it is desired to assure the maintenance of the pleated condition in the honeycomb structure, the present invetion is of great advantage. By having the opposite sides of the structure formed from separate independent materials, stresses at the points of attachment of the adjacent cells are kept to a minimum. These stresses are particularly troublesome where adhesive is used to effect this attachment and the honeycomb structure is suspended with the cells one below the other pulling on the cells above. With the construction of the present invention, the stresses placed on the cell joints are mainly those required to keep the two pieces of material attached horizontally at the joint locations. The vertical pulling forces resulting from hanging the honeycomb structure tend to pass from cell to cell by simply pulling on the two pieces of material separately of each other. Also, one side of the structure can be formed with permanent creases, while the other formed with light creases which will hang out in the expanded condition of the honeycomb structure. This other side will also be formed with an amount of material which is less than that on the pleated side, so that in the fully expanded condition of the structure, the faces of the cells on the lightly creased side will extend in a generally straight plane. Thus, there is no further tendency for the cells of the honeycomb structure to expand or for the pleats on the one side to fall out.

DESCRIPTION OF THE PREFERRED EMBODIMENTS

Figure 1:
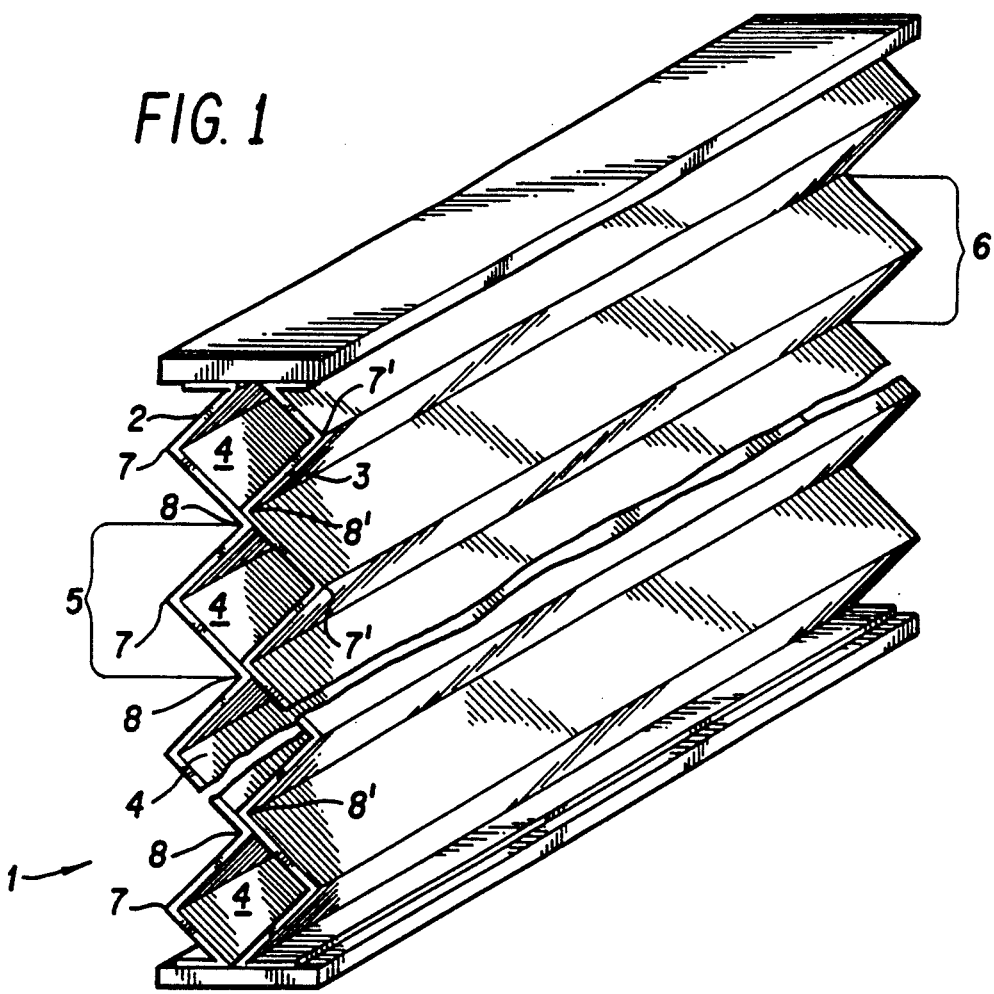
FIG. 1 is a perspective view of the honeycomb structure in its expanded condition and fabricated in accordance with the teachings of the present invention.

FIG. 1 shows a honeycomb structure, generally designated by reference number 1, as comprising two separate materials, namely a first material 2 and a second material 3. These materials are secured together at spaced intervals to form individual cells 4 having front faces 5 and back faces 6. For the purpose of easy identification, the faces 5 are referred to as front faces, and the faces 6 as back faces. "Front" and "back" hold no limitation as to the position of the structure, for example, when used as window coverings in building constructions. Also, "honeycomb" is used in the broad sense to mean connected cells, not necessarily hexogonal, as described and shown herein. As seen from FIG. 1, the front faces of all of the cells are formed from the single piece of material 2 while the back faces of all of the cells are formed from the single piece of material 3.

Figure 2:
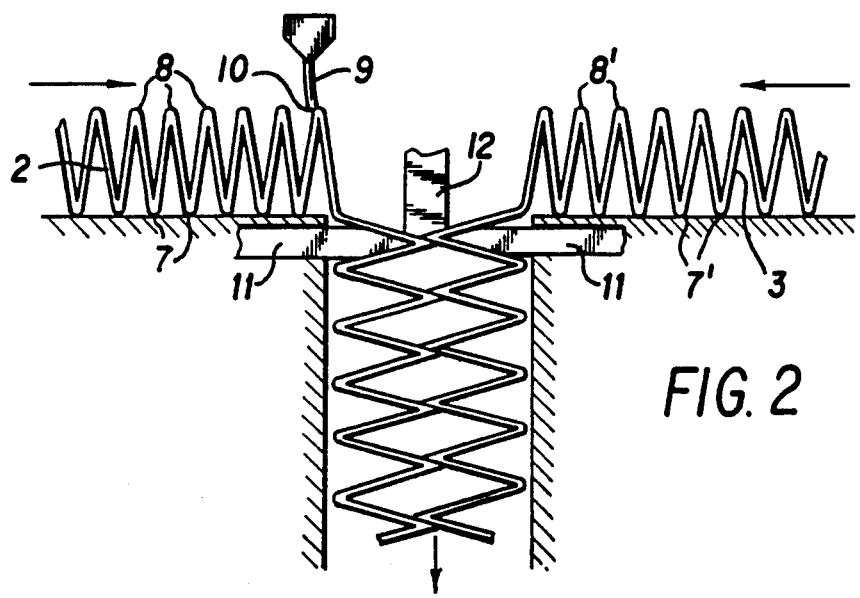
FIG. 2 is a schematic view showing the manufacturing process employed in producing the honeycomb structure of FIG. 1.

As shown in FIG. 2, the honeycomb structure 1 is formed by continuously feeding a continuous length of each of the materials 2 and 3 longitudinally of their length and in directions extending toward each other. The material 2 has a first set of transverse creases 7 spaced along the length of material, and the second material 3 has a similar first set of transverse creases 7'. The first material also has a second set of transverse creases 8 spaced along the length of the material in alternating fashion with the first set of creases 7. Similarly, the second piece of material 3 has a second set of transverse creases 8' spaced in alternating fashion with the first set of creases 7'. The first and second set of creases on both materials are formed alternately on opposite sides of the material so as to permit the materials to collapse in the accordion pleated fashion shown in FIG. 2 where the creases define the edges of the pleats.

As the first and second materials are fed in opposite directions, they are each fed along a first path in partially collapsed condition. As they near each other, they are progressively turned about 90° and fed along a second common path. With the embodiment of the honeycomb structure shown in FIGS. 1 and 2, the successive pleats 8 and 8' of the two pieces of material are brought into overlapping relationship as they are turned from their first path into the common second and they are then directly joined together in this overlapping relationship. For this purpose, adhesive may be applied to one or both of the materials adjacent the creases 8 and 8'. FIG. 2 shows schematically an adhesive applicator at 9 for applying a band of adhesive 10 to one side of each of the pleats 8. This adhesive may extend the full length of the pleat or be applied intermittently.

As the successive pleats 8, 8' are brought into overlapping relationship, they are supported by suitable backup structure 11 while a pressure member 12 moves down onto the overlapped pleats to press them into adhering relationship. The backup structure 11 can be intermittently moved into and out of supporting relationship and can also be used to move the combined cell structure downwardly along the second common path after each set of pleats is secured together.

As shown in FIGS. 1 and 2, the two materials are joined together at the overlapped pleats and this joining is immediately adjacent the creases 8, 8'. Therefore, these creases are retained for aiding in the folding of the two materials as the cells are moved to and from collapsed and expanded condition. It is also seen that the attachment of the cells together is intermediate the first set of creases 7, 7'. Thus, the pleats associated with these creases remain for giving the resulting honeycomb structure a pleated appearance on both sides.

Further, as seen from FIG. 2, the connecting of the adjacent cells together is effected while the two materials 2 and 3 are maintained in partially expanded condition. Thus, any bleeding of adhesive through the materials during the adhesive application or pressing operation will not cause any severe manufacturing problems as encountered with the prior art where adjacent cells can become improperly secured together and unopenable. With the present invention, it is only necessary that the cells remain in their partially expanded condition until the adhesive is set.

It will also be appreciated that if the bottom cells are pulled from the top cells as by their own weight and as would occur when hung vertically. The tendency is to collapse the cell structures but not to pull the joints apart. With this reduction in stress on the adhesive joints between the cells, there will be a great deal more latitude in types of adhesive that may be used, and, in fact, the types of joints by which the cells are connected. For example, with the embodiments shown in FIG. 1, wide space stitching could be employed instead of adhesive. Also, heat welding becomes practical, depending on the types of material, and in some situations, spot connections can be made along the length of the cells rather than a continuous connection.

Figure 3:
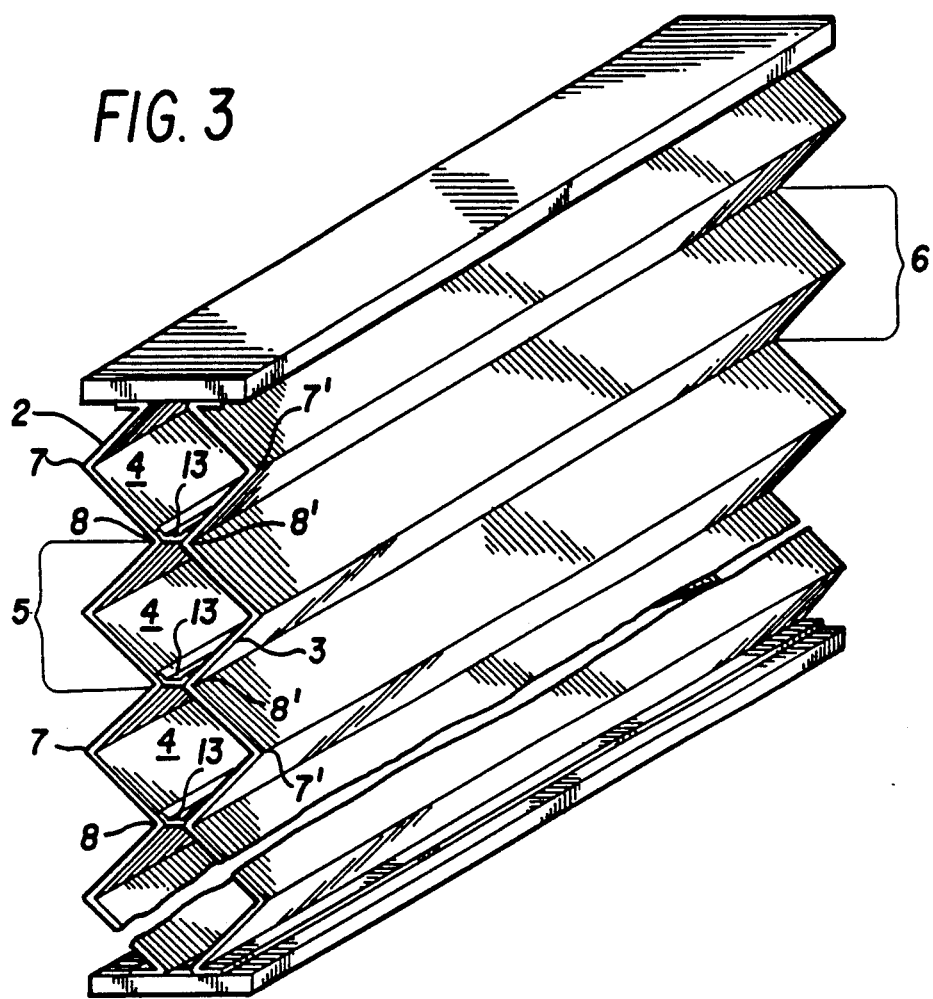
FIG. 3 is a perspective view of another embodiment of the honeycomb structure of the present invention.
Figure 4:
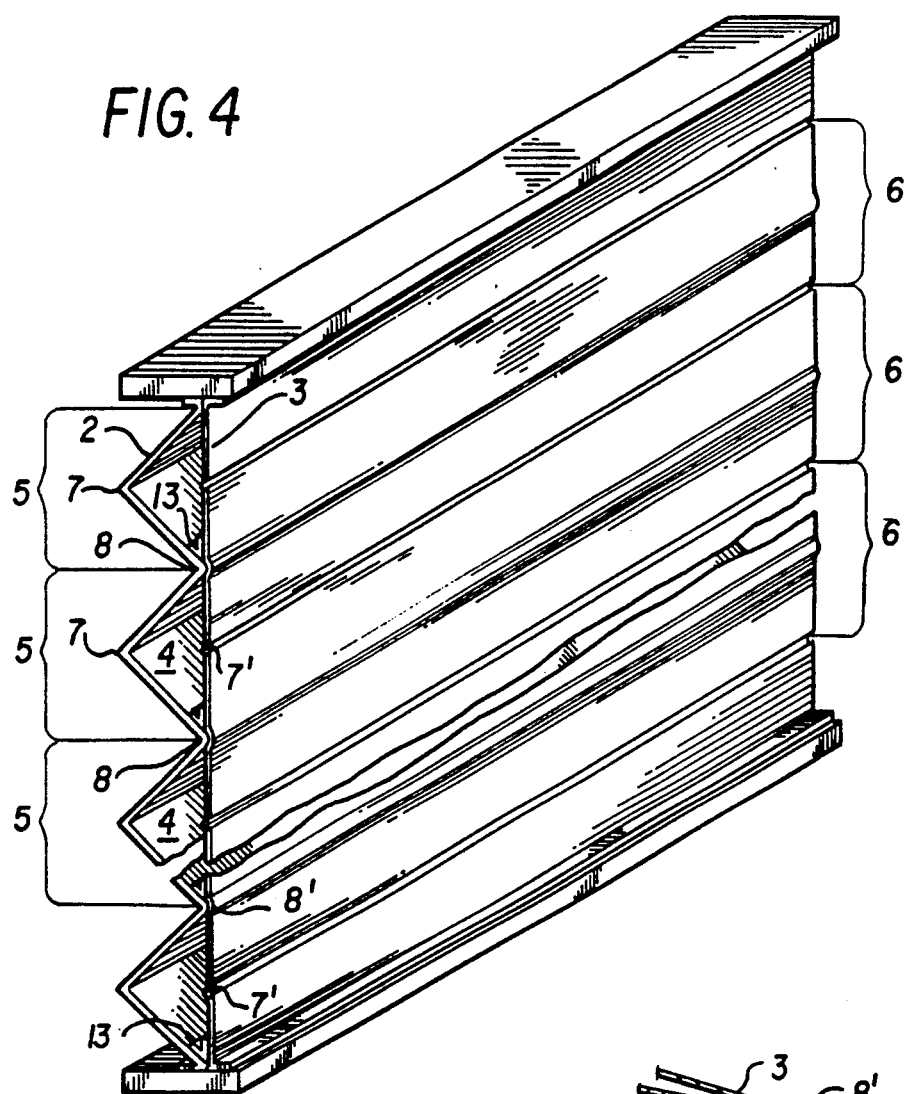
FIG. 4 is a perspective view of still another embodiment of the honeycomb structure of the present invention.
Figure 5:
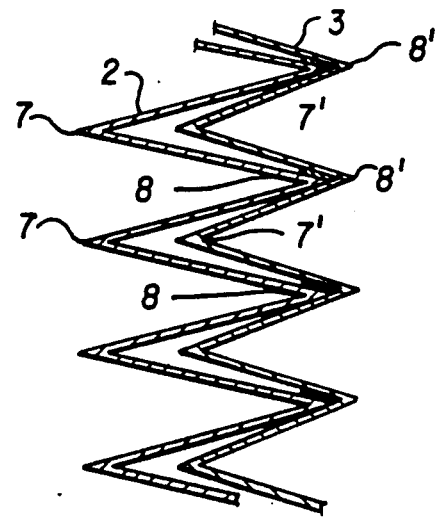
FIG. 5 is a cross-sectional view showing the honeycomb structure of FIG. 4 in partially collapsed condition.

Turning to the embodiments shown in FIGS. 3 and 4, the front and back faces 5 and 6 of the honeycomb structure are not directly connected together as in the embodiment of FIG. 1. Instead, they are connected together by separate strip material 13 disposed between the adjacent cells 4 and extending longitudinally of the cells. The strip materials can be used to connect the two pieces of material 2 and 3 together in spaced relationship as shown in FIG. 3, or in non-spaced relationship as shown in FIGS. 4 and 5. With the embodiment of FIG. 3, the spaced relationship of the materials 2 and 3 produces cell structures 4 having their front faces 5 spaced from their back faces 6. This provides superior insulating qualities due to the cell structure than result with the embodiments of FIGS. 1 and 4. Also, the spaced relationship provides for concealment of the cords that may be associated with the honeycomb structure where it is used for a window covering.

Figure 6:
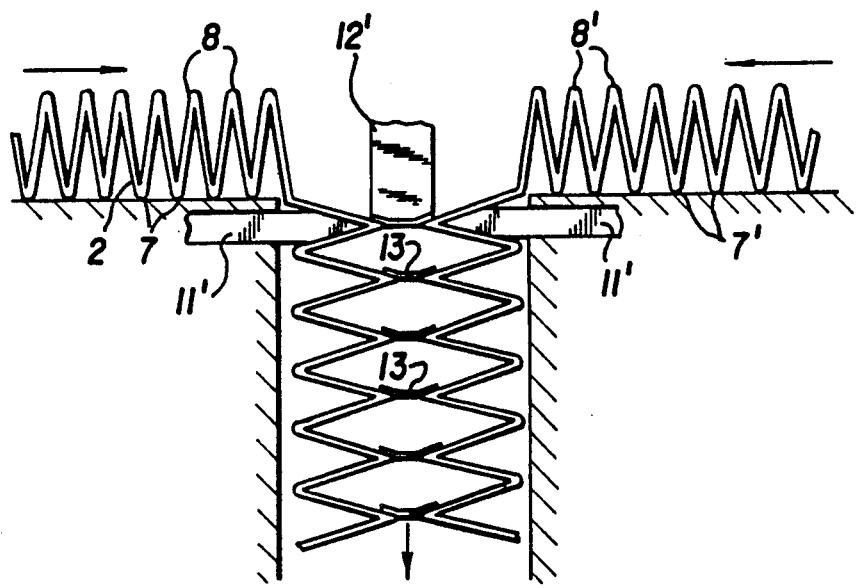
FIG. 6 is a schematic view showing the manufacturing process employed in producing the honeycomb structures of FIGS. 3 and 4.

FIG. 6 shows schematically the method of manufacture used in producing the honeycomb structures of FIGS. 3, 4 and 5. With respect to the embodiment shown in FIG. 3, the two pieces of pleated material are fed along their first path; and as they are turned into the second common path, the pleats associated with the creases 8, 8' are brought into laterally spaced relationship with each other. As each pair of associated pleats attain this spaced relationship, a piece of strip material 13 is brought into overlying relationship with the pleats and adhered thereto. For this purpose, suitable support means 11' and a cooperating pressure member 12'; similar in construction and operation to corresponding means shown in FIG. 2, is used. Similarly, adhesive can be applied to each of the materials adjacent the pleats or the strip material can have one side coated with adhesive. This latter construction is used in the embodiment shown in FIG. 6.

As with the joining of the adjacent cells of the embodiment of FIG. 1, the strip connection of the embodiment of FIG. 3 is made immediately adjacent the creases 8, 8' which define the pleats. Thus, these creases remain effective to assist in the collapsing and expanding of the adjacent cells.

For constructing the honeycomb structure of FIG. 4 the materials 2 and 3 are turned into the second path with the associated pleats in touching non-overlapping contact with each other along the associated creases 8, 8'.

The embodiment of FIGS. 4 and 5 also shows other features of the present invention. More particular, the two pieces of material are connected together with the pleats facing in the same direction as opposed to facing in opposite directions, as with the emobidment of FIG. 3. Thus, as the structure is collapsed, the arrangement of FIG. 5 will result.

Also, in the embodiment of the invention shown in FIGS. 4 and 5, the front face 5 of each cell has a greater amount of material extending between adjacent cells than the back face thereof. This is effected by spacing the first and second set of creases 7 and 8 on the first material 2 by distances greater than the spacing of the creases 7', 8' of the second piece of material 3. To get the straight sided appearance of FIG. 4, the creases 7', 8' on the material 3 are spaced from each other by a distance which is equal to one-half the distance any one cell extends between its adjacent cells in the normal expanded condition on the honeycomb structure. The spacing of these creases this way and forming them so that they generally fall out in the expanded condition of the cells permits the material 3 to readily assume the straight condition in FIG. 4 with each of the faces 6 extending in a straight plane between adjacent cells. The creases 7', however, will be formed sufficiently enough to normally direct the back faces to collapse inwardly of the cell as shown in FIG. 5. Finally, with the creases 7 on the material 2 being permanently formed, they will maintain the first material in sharp angular configuration in the normal expanded condition of the structure.

I claim:

1. The method of fabricating an expandable honeycomb structure of a plurality of cells, one on top of the other, comprising the steps of:
    (a) continuously feeding a continuous length of a first material longitudinally of said length, said material having a first set of transverse creases spaced along the length thereof;
    (b) continuously feeding a continuous length of a second material longitudinally of said length and toward said first material, said second material having a first set of transverse creases spaced along the length thereof; and
    (c) joining the two materials together intermediate said first sets of creases.

2. The method according to claim 1 wherein:
    (a) said first and second materials each have a second set of transverse creases spaced along the length thereof in alternating fashion with the first set of creases; and (b) said two materials are joined together immediately adjacent said second sets of creases.

3. The method according to claim 2 wherein:
(a) the first and second sets of creases are formed on opposite sides of said first and second materials to collapse said materials in accordian pleated fashion with said first and second sets of creases defining first and second sets of pleats, respectively;
(b) said first and second materials are fed along first paths toward each other while at least in partially collapsed condition;
(c) said first and second materials are progressively turned into and fed along a second, common path; and
(d) said materials are connected together along said second sets of pleats as they are turned into said second path.

4. The method according to claim 3 wherein said first and second materials are:
(a) turned into overlapping relationship at said second sets of pleats and immediately adjacent said second sets of creases; and
(b) joined together in said overlapping relationship.

5. The method according to claim 3 further comprising:
(a) feeding a piece of strip material sucessively into overlying relationship with each second set of pleats of the first and second materials adjacent the second set of creases as the materials are turned into said second path; and
(b) adhering said strip material to each of said second set of pleats immediately adjacent said second set of creases.

6. The method according to claim 5 wherein:
(a) said first and second materials are turned into said second path with the second sets of pleats laterally spaced from each other.

7. The method according to any one of claims 3-6 wherein:
(a) the first and second materials are connected together with the second sets of pleats facing in opposite directions.

8. The method according to claim 5 wherein:
(a) said first and second materials are turned into said second path with the second sets of pleats in touching non-overlapping contact along the second set of creases.

9. The method according to claim 8 wherein:
(a) the first and second materials are connected together with the second sets of pleats facing in the same direction.

10. The, method according to any one of claims 1-6, 8 and 9 wherein:
(a) the first and second sets of creases on said first material are spaced from each other by a distance greater than the spacing thereof on said second material.

11. The method according to claim 10 wherein:
(a) the first and second sets of creases in said second material are spaced from each other by one-half the distance any one cell extends between adjacent cells in the normal expanded condition of the honeycomb structure.

12. The method according to claim 11 wherein:
(a) the first set of creases on the first material are formed to maintain the first material in angular configuration in the normal expanded condition of the honeycomb structure; and
(b) the first set of creases on the second material are formed to fall out to orient the second material in a generally straight place in the normal expanded condition of the honeycomb structure.

* * * * *